United States Patent
Mizutani et al.

(10) Patent No.: US 9,033,769 B2
(45) Date of Patent: May 19, 2015

(54) DUST COLLECTING ATTACHMENT FOR ELECTRIC POWER TOOL AND ELECTRIC POWER TOOL

(71) Applicants: Akira Mizutani, Anjo (JP); Hideharu Muto, Anjo (JP)

(72) Inventors: Akira Mizutani, Anjo (JP); Hideharu Muto, Anjo (JP)

(73) Assignee: MAKITA CORPORATION, Anjo (JP)

( * ) Notice: Subject to any disclaimer, the term of this patent is extended or adjusted under 35 U.S.C. 154(b) by 219 days.

(21) Appl. No.: 13/645,148

(22) Filed: Oct. 4, 2012

(65) Prior Publication Data

US 2013/0115863 A1    May 9, 2013

(30) Foreign Application Priority Data

Nov. 8, 2011    (JP) ................................ 2011-244772

(51) Int. Cl.
    *B24B 55/10*    (2006.01)
    *B23Q 11/00*    (2006.01)

(52) U.S. Cl.
    CPC ............ *B24B 55/10* (2013.01); *B23Q 11/0046* (2013.01)

(58) Field of Classification Search
    CPC ........ B24B 55/06; B24B 55/10; B24B 23/00; B23Q 11/0046; B23D 59/006; Y10S 29/064; Y10S 29/079
    USPC .................................. 451/456, 357, 358, 359
    See application file for complete search history.

(56) References Cited

U.S. PATENT DOCUMENTS

| | | | | |
|---|---|---|---|---|
| 1,093,049 A * | 4/1914 | Hawley | ..................... | 433/116 |
| 2,773,337 A * | 12/1956 | De Marchi | ................... | 451/352 |
| 3,126,021 A * | 3/1964 | May | ............................. | 132/76.4 |
| 3,882,598 A * | 5/1975 | Earle et al. | ...................... | 30/390 |
| 4,226,054 A * | 10/1980 | Coty | ............................. | 451/453 |
| 5,220,753 A * | 6/1993 | Whitman | ...................... | 451/456 |
| 5,518,442 A * | 5/1996 | Clowers et al. | ............... | 451/359 |
| 5,759,094 A | 6/1998 | Bosten et al. | | |
| 6,224,471 B1 * | 5/2001 | Clowers et al. | ............... | 451/359 |
| 6,830,507 B2 * | 12/2004 | Reich et al. | ................... | 451/453 |
| 6,910,960 B2 * | 6/2005 | Reich et al. | ................... | 451/451 |
| 2005/0281627 A1 | 12/2005 | Britz | | |
| 2009/0247059 A1 | 10/2009 | Kammerer | | |

FOREIGN PATENT DOCUMENTS

| | | |
|---|---|---|
| DE | 102008005954 B3 | 4/2009 |
| DE | 102008007520 A1 | 8/2009 |
| JP | H06-320409 A | 11/1994 |
| JP | B2-07-77707 | 8/1995 |

(Continued)

OTHER PUBLICATIONS

Mar. 22, 2013 Extended European Search Report issued in European Patent Application No. 12187653.6.

(Continued)

*Primary Examiner* — Maurina Rachuba
(74) *Attorney, Agent, or Firm* — Oliff PLC (57) ABSTRACT

A dust collecting attachment that is mounted on a sander includes a suction portion mounted on a portion of a front housing where an output shaft projects, a flexible hose having a front end of the flexible hose connected to the suction portion, a discharge portion connected to a rear end of the flexible hose and a changeable member placed on both a motor housing and the discharge portion. The changeable member allows the discharge portion to be mounted at any position around an axis of the motor housing.

5 Claims, 11 Drawing Sheets

(56) References Cited

FOREIGN PATENT DOCUMENTS

| | | |
|---|---|---|
| JP | 3 153 141 U | 4/2001 |
| WO | WO 01/23137 A1 | 4/2001 |

OTHER PUBLICATIONS

Mar. 3, 2015 Japanese Office Action issued in Japanese Application No. 2011-244772.

* cited by examiner

DUST COLLECTING ATTACHMENT FOR ELECTRIC POWER TOOL AND ELECTRIC POWER TOOL

BACKGROUND OF THE INVENTION

This application claims the benefit of Japanese Patent Application Number 2011-244772 filed on Nov. 8, 2011, the entirety of which is incorporated by reference.

TECHNICAL FIELD

The present invention relates to dust collecting attachments for electric power tools, which are mounted on electric power tools such as a sander so as to be used to collect power dust generated by processing a workpiece, and electric power tools using such dust collecting attachments.

BACKGROUND ART

Dust collecting attachments for electric power tools (hereinafter simply referred to as the "dust collecting attachments"), which can be connected to an external dust collecting device or a dust collecting bag, are mounted on electric power tools such as a sander and a grinder in order to collect, without scattering, power dust generated from a workpiece during processing. For example, a dust collecting attachment as described in, for example, Japanese Examined Patent Publication No. H07-77707 (JP H07-77707 B2) is known in the art in which a hood is mounted on a housing having an output shaft projecting therefrom, and a flat hose that is connected to the hood is extended rearward along the lower surface of the housing.

In such a conventional dust collecting attachment, however, in the case where the tool body is used as a handle portion for the operator, the operator needs to hold the handle portion together with the hose on the lower side. Thus, it makes the operator difficult to hold the handle portion, and operability may be affected. As a result, the hose can be used on the lateral side of the tool body on which the fingers do not touch. In this case, however, depending on the operator's dominant hand, it may be necessary to hold the handle portion together with the hose eventually. Therefore, the dust collecting attachment may obstruct the operation using the tool close to a wall etc., which may decrease workability.

SUMMARY OF THE INVENTION

It is an object of the present invention to provide a dust collecting attachment that can be mounted on an electric power tool such that the operator does not need to hold a hose and further, the dust collecting attachment does not obstruct the operation regardless of his/her dominant hand, and an electric power tool using the dust collecting attachment.

In order to achieve the above object, a first aspect of the present invention is a dust collecting attachment for an electric power tool, which is mounted on the electric power tool that has a housing extending in a longitudinal direction and used as a holding portion, and an output shaft projecting downward from a front part of the housing. Further, the dust collecting attachment for the electric power tool includes a suction portion mounted on a portion of the housing where the output shaft projects, a flexible hose having a front end of the flexible hose connected to the suction portion, a discharge portion connected to a rear end of the flexible hose and a changeable member placed on both the housing and the discharge portion. The changeable member allows the discharge portion to be mounted at any position around an axis of the housing.

According to a second aspect of the present invention, in the configuration of the first aspect, the suction portion includes a holder ring mounted on a lower surface of the housing in a state that the output shaft is loosely inserted in the holder ring, and a cylindrical front joint coupled to a lateral surface of the holder ring and connected to the flexible hose. When the holder ring is mounted on the lower surface of the housing in such a direction that the front joint extends rearward, the suction portion and the front end of the flexible hose are also connected on a lower side of the housing. Further, the front joint has an engaging member to be engaged with the housing.

According to a third aspect of the present invention, in the configuration of the first or second aspect, the changeable member allows the discharge portion to be mounted at least at laterally symmetrical positions with respect to the housing.

According to a fourth aspect of the present invention, an electric power tool includes a housing extending in a longitudinal direction and used as a holding portion, an output shaft projecting downward from a front part of the housing and the dust collecting attachment for the electric power tool according to the first aspect.

According to a fifth aspect of the invention, a dust collecting attachment for an electric power tool, which is mounted on the electric power tool that has a housing extending in a longitudinal direction and used as a holding portion, and an output shaft projecting downward from a front part of the housing. Further, the dust collecting attachment for the electric power tool includes a suction portion mounted on a portion of the housing where the output shaft projects, a pipe having a front end of the pipe connected to the suction portion, a discharge portion connected to a rear end of the pipe, and a changeable member that is placed on both the housing and the discharge portion and allows the discharge portion to be mounted at laterally symmetrical positions with respect to the housing, wherein the pipe is divided into a plurality of divided pipes detached from each other and reconnected together in laterally reversed orientation, and by selecting lateral orientation of the divided pipes, the pipe can connect the suction portion and the discharge portion on a lateral surface side of the housing which corresponds to a lateral position of the discharge portion.

According to a sixth aspect of the present invention, in the configuration of the fifth aspect, the pipe is formed so that at least a portion along a lateral surface of the housing has a flat transverse section conforming to the lateral surface.

According to a seventh aspect of the present invention, in the configuration of the fifth aspect, the divided pipes are connected by insertion, wherein a protrusion is formed in one of an inserted end and a receiving end of the divided pipes, and a through hole or a recess is formed in the other end so that the protrusion fits in the through hole or the recess when both of the ends are connected by insertion.

According to a eighth aspect of the invention, an electric power tool includes a housing extending a longitudinal direction and used as a holding portion, an output shaft projecting downward from a front part of the housing and the dust collecting attachment for the electric power tool according to the fifth aspect.

According to the present invention, the dust collecting attachment can be mounted on the electric power tool such that the operator does not need to hold the flexible hose or the pipe, and the dust collecting attachment does not obstruct the operation regardless of his/her dominant hand. Thus, usability can be improved.

In particular, according to the second aspect of the invention, in addition to the effects of the first aspect, the front end of the flexible hose can be stably supported on the lower side of the housing by using the engaging member.

According to the third aspect of the invention, in addition to the effects of the first or second aspect, the position where the flexible hose is extended can be selected according to the dominant hand and the operation.

According to the sixth aspect of the invention, in addition to the effects of the fifth aspect, the pipe has a flat shape such that only a small portion of the pipe projects from the housing even if the pipe is extended. Therefore, the pipe may not obstruct the operation.

According to the seventh aspect of the invention, in addition to the effects of the fifth aspect, the protrusion and the through hole or the recess may prevent the inserted ends from detaching from coming off. Therefore, the stable connection of the pipe may be realized.

DETAILED DESCRIPTION OF THE EMBODIMENTS

Embodiments of the present invention will be described below with reference to the accompanying drawings.

[First Embodiment]

Figure 1:
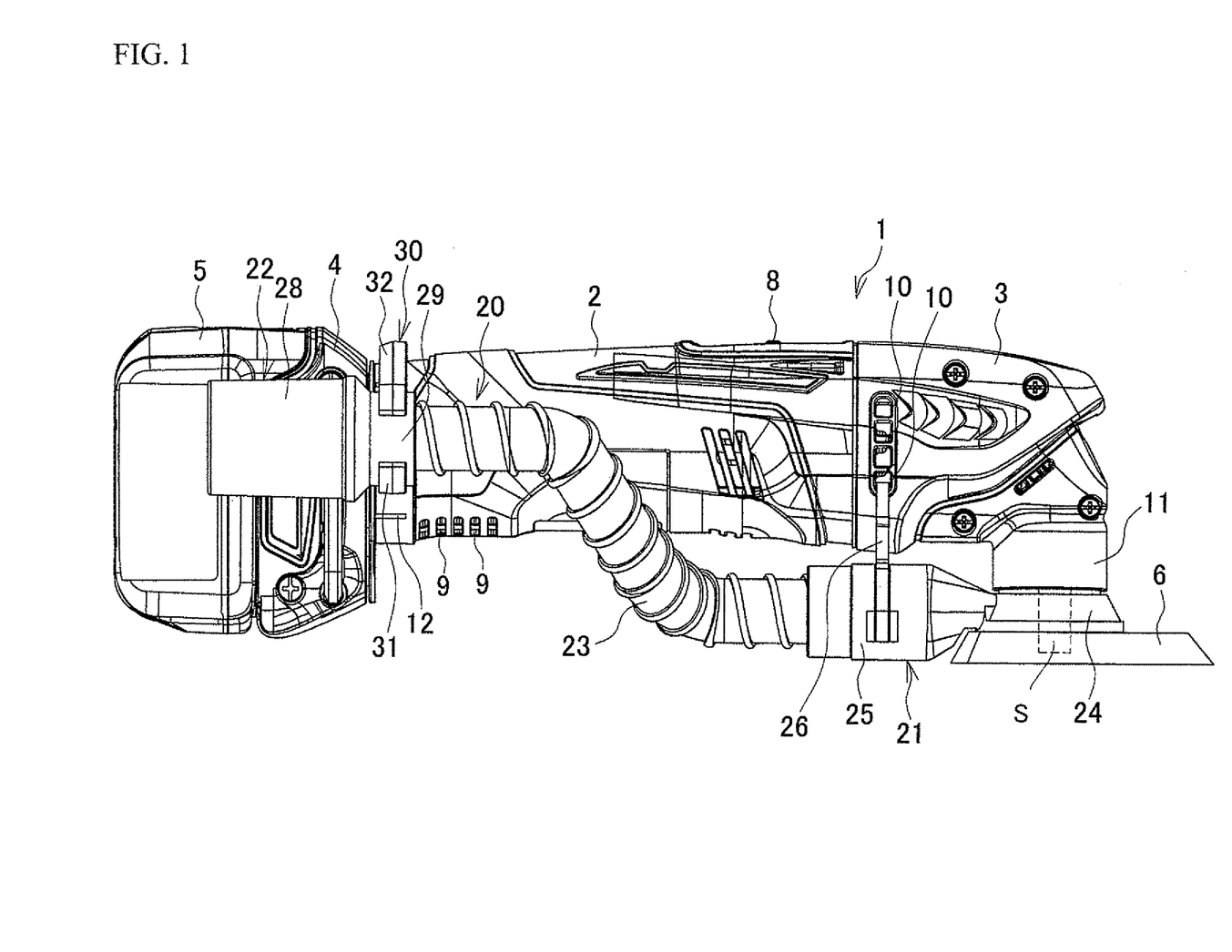
FIG. 1 is a side view of a sander according to a first embodiment of the present invention.
Figure 2:
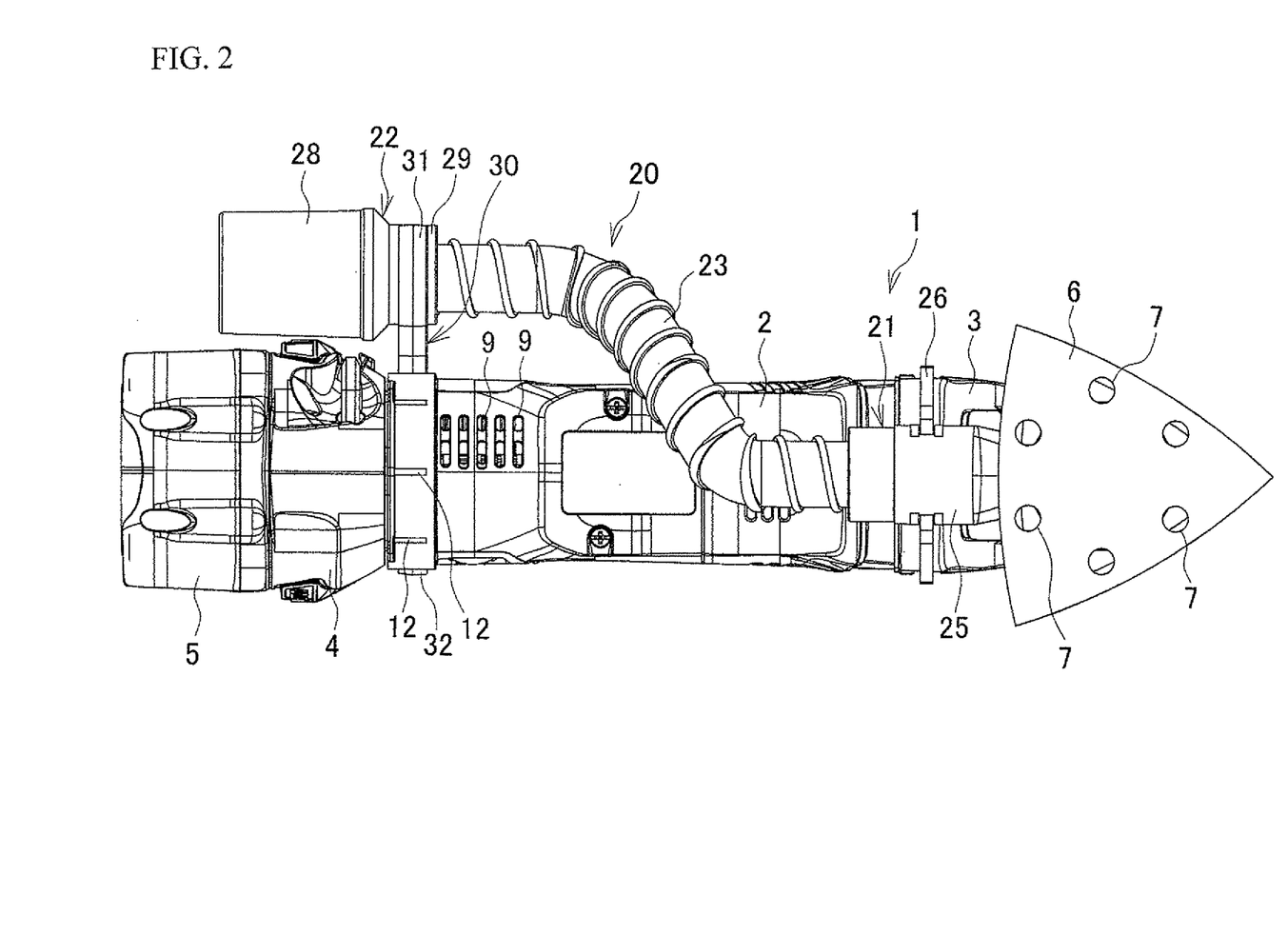
FIG. 2 is a bottom view of the sander according to the first embodiment.

FIG. 1 is a side view of a sander as an example of an electric power tool, and FIG. 2 is a bottom view thereof. In a sander 1, a front housing 3 is connected to the front (the right side in FIG. 1) of a cylindrical motor housing 2, and a battery pack 5 as a power source is mounted on a mounting portion 4 formed at the rear end of the motor housing 2. The motor housing 2 accommodates a motor, not shown, and an output shaft S is in a lower portion of the front housing 3 so as to project downward from the front housing 3, as shown in FIG. 1. A swing mechanism, not shown, which converts rotation of a motor shaft to lateral swing motion of the output shaft S is contained in the front housing 3. A base 6, which has a triangular shape as viewed in plan, is mounted on the lower end of the output shaft S perpendicularly to the direction in which the output shaft S extends, and a plurality of dust collecting holes 7, 7 are formed in the base 6 so as to extend therethrough. A switch 8 is provided in a front part of the upper surface of the motor housing 2. Air inlets 9, 9 for motor cooling air are formed in a rear part of the lower surface of the motor housing 2, and air outlets 10, 10 for motor cooling air are formed in both right and left side surfaces of the front housing 3.

Figure 3:
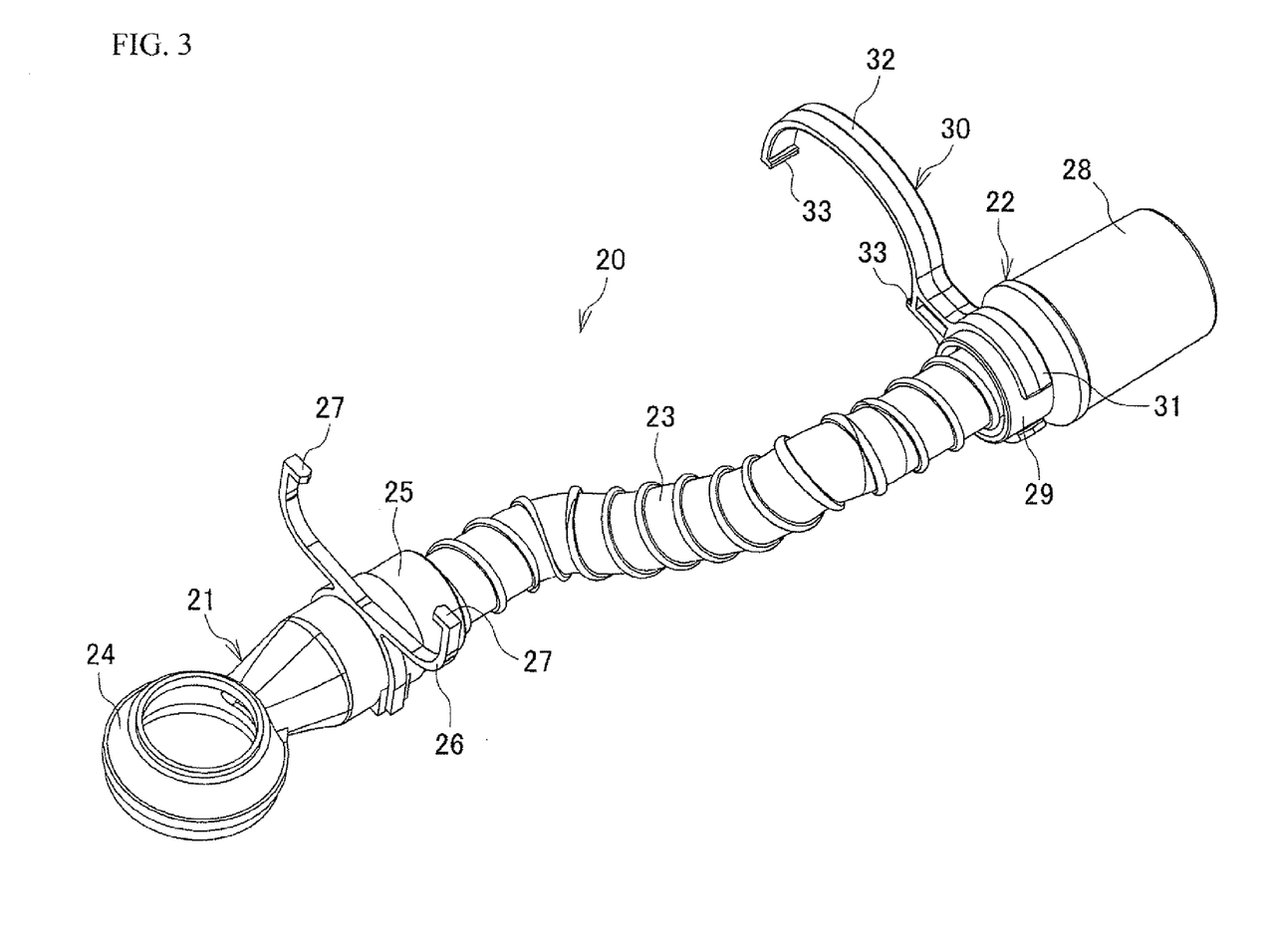
FIG. 3 is a perspective view of a dust collecting attachment according to the first embodiment.

A dust collecting attachment 20 is mounted on the sander 1. As also shown in FIG. 3, the dust collecting attachment 20 has a suction portion 21 in its front part, and a discharge portion 22 in its rear part. A flexible hose 23 is connected between the suction portion 21 and the discharge portion 22.

The suction portion 21 has a tapered holder ring 24 that is tapered upward, and a cylindrical front joint 25 which is connected to the lateral surface of the holder ring 24 in a radial direction, and to which the front end of the flexible hose 23 is connected by insertion.

The holder ring 24 is placed above the base 6 and fitted on the output shaft S, and the upper end of the holder ring 24 is fitted in a cylinder portion 11 formed in a lower part of the front housing 3. Thus, the holder ring 24 is mounted between the front housing 3 and the base 6 so as to close the space therebetween, while the inside of the holder ring 24 communicates with the dust collecting holes 7, 7.

An engaging member 26 is integrally attached to the front joint 25. The engaging member 26 has a U-shape, and the both ends of the engaging member 26 serve as engaging portions 27, 27 projecting toward each other. In this example, with the front joint 25 being turned to extend rearward, the engaging member 26 is fitted on the lower part of the front housing 3, whereby the right and left engaging portions 27, 27 can be engaged with the air outlets 10, 10 on the lateral surfaces of the front housing 3, respectively. Thus, the front joint 25 is retained so as to extend rearward at a position above the lower surface of the base 6.

Figure 5:
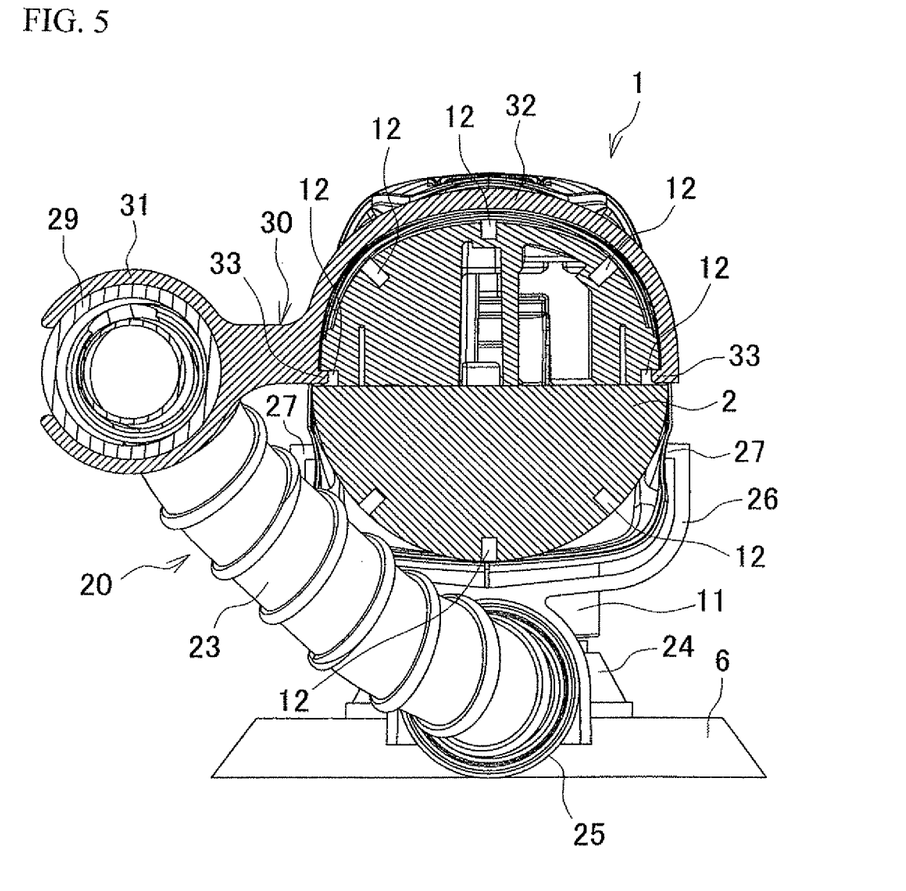
FIG. 5 is a cross-sectional view of a mounting portion of a changeable member in FIG. 4.

The discharge portion 22 comprises a cylindrical rear joint 28 and a changeable member 30. The rear joint 28 has a small diameter portion 29 at its front end, and the rear end of the flexible hose 23 is connected to the small diameter portion 29 by insertion. The changeable member 30 is detachably mounted to the front end of the rear joint 28. The changeable member 30 has a C-shaped holding portion 31 capable of holding the small diameter portion 29 of the rear joint 28, and a semicircular band portion 32 connected to the holding portion 31. The band portion 32 is shaped so as to be able to fit on the connection edge of the motor housing 2 with the mounting portion 4 for the battery pack 5. Claw portions 33, 33 are formed at the right and left ends of the band portion 32 so as to project toward each other. As also shown in FIG. 5, a plurality of pairs of engaging holes 12, 12 corresponding to the claw portions 33, 33 of the band portion 32 are formed in the outer periphery of the connection edge of the motor housing 2 with the mounting portion 4 so as to be located not only at the positions on the left and right sides but also at the positions shifted in phase from the right and left sides by a predetermined angle (in this example, 45°).

In the sander 1 and the dust collecting attachment 20 configured above, the state in which the flexible hose 23 is extended can be changed by selecting the direction in which the changeable member 30 is mounted on the rear joint 28.

First, the holder ring 24 of the suction portion 21 is mounted on the cylindrical portion 11, and is rotated so that the front joint 25 extends rearward. Then, the engaging portions 27, 27 of the engaging member 26 are engaged with the air outlets 10, 10. In order to extend the flexible hose 23 on the left surface side of the sander 1, the changeable member 30 is placed transversely so that the holding portion 31 is located on the left side. In this state, the changeable member 30 is mounted on the small diameter portion 29 of the rear joint 28, and the band portion 32 is fitted on the motor housing 2 from above so that the claw portions 33, 33 are engaged with the left and right engaging holes 12, 12. Therefore, as shown in FIGS. 1 and 2, the discharge portion 22 is supported on the left surface of the motor housing 2 so as to be parallel thereto, and the flexible hose 23 is accordingly extended from the lower surface of the motor housing 2 to the left surface thereof.

Figure 4:
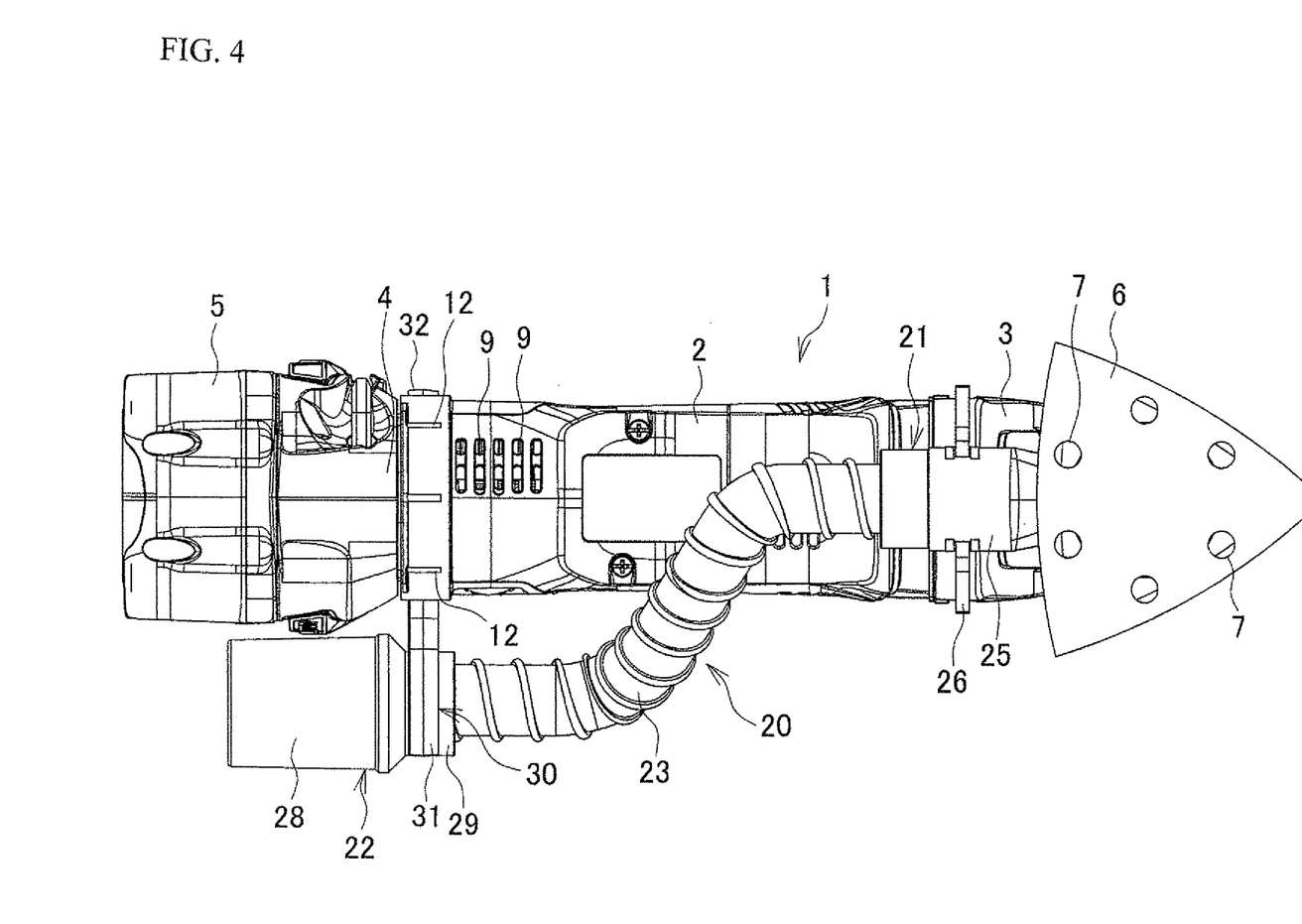
FIG. 4 is a bottom view of the sander according to the first embodiment in which a flexible hose is extended on the opposite side.

On the other hand, in order to extend the flexible hose 23 on the right surface side of the sander 1, the changeable member 30 is reversed in lateral orientation from that of the above-described configuration. That is, the changeable member 30 is placed transversely so that the holding portion 31 is located on the right side. In this state, the changeable member 30 is mounted on the small diameter portion 29 of the rear joint 28, and the band portion 32 is fitted on the motor housing 2 from above so that the claw portions 33, 33 are engaged with the left and right engaging holes 12, 12. Thus, as shown in FIG. 4, the discharge portion 22 is supported on the right surface of the motor housing 2 so as to be parallel thereto, and the flexible hose 23 is accordingly extended from the lower surface of the motor housing 2 to the right surface thereof.

Similarly, in order to extend the flexible hose 23 on the lower surface side of the sander 1, the changeable member 30 is placed vertically so that the holding portion 31 mounted on the flexible hose 23 is located at a lower position. In this state, the band portion 32 located on the upper side is fitted on the motor housing 2 from the left or right side, and the claw portions 33, 33 are engaged with the upper and lower engaging holes 12, 12. In order to extend the flexible hose 34 obliquely on the right or left surface side of the sander 1, the engaging holes 12, 12 corresponding to the desired angle are selected, and the claw portions 33, 33 of the band portion 32 are engaged with these engaging holes 12, 12. By changing the position of the discharge portion 22 about the axis of the motor housing 2 in this manner, the flexible hose 23 can be easily extended at the position where the flexible hose 23 does not obstruct the operation, according to the dominant hand and the operation condition.

When using the sander 1, e.g., a hose of an external dust collecting device is connected to the rear joint 28. In this state, the operator holds the motor housing 2 as a holding portion with one hand, and operates the switch 8 to drive the motor. As a result, the base 6 swings in a lateral direction, whereby a workpiece can be polished with sanding paper attached to the lower surface of the base 6. By the operation of the dust collecting device, dust generated by polishing is sucked while passing through the holder ring 24 of the suction portion 21 via the dust collecting holes 7, and is then directed from the front joint 25 through the flexible hose 23 to the discharge portion 22. Thereafter, the dust is discharged from the rear joint 28 and collected by the dust collecting device.

As described above, the dust collecting attachment 20 and the sander 1 of the first embodiment include the suction portion 21 mounted on the portion of the front housing 3 where the output shaft S projects, the flexible hose 23 having its front end connected to the suction portion 21, the discharge portion 22 connected to the rear end of the flexible hose 23, and the changeable member 30 placed on both the motor housing 2 and the discharge portion 22 and allowing the discharge portion 22 to be mounted at any position around the axis of the motor housing 2. Thus, the flexible hose 23 can be mounted on the sander 1 such that the operator does not need to hold the flexible hose 23 and the flexible hose 23 does not obstruct the operation regardless of his/her dominant hand. Therefore, usability is improved.

In particular, in this example, the suction portion 21 includes the holder ring 24 mounted on the lower surface of the front housing 3 in a state that the output shaft S is loosely inserted therein, and the cylindrical front joint 25 coupled to a lateral surface of the holder ring and connected to the flexible hose, and the holder ring 24 is mounted in such a direction that the front joint 25 extends rearward. Therefore, the suction portion 21 and the front end of the flexible hose 23 are connected on the lower side of the front housing 3. Moreover, the front joint 25 is provided with the engaging member 26 that engages with the front housing 3. Accordingly, the front end of the flexible hose 23 can be stably supported on the lower side of the front housing 3.

Moreover, the changeable member 30 allows the discharge portion 22 to be mounted at least at laterally symmetrical positions with respect to the motor housing 2. Thus, the position where the flexible hose 23 is extended can be selected according to the dominant hand and the operation.

Although the engaging member is engaged with the air outlets in the first embodiment, the present invention is not limited to this, and an engaging recess or an engaging through hole may be separately provided in the outer surface of the housing.

The mounting configuration of the changeable member can be changed as appropriate. For example, the number of engaging holes and the positions thereof may be changed. Alternatively, the engaging holes may be eliminated, and the length of the band portion of the changeable member may be increased so that the band portion is wound around the housing, and the changing member may be fixed at any phase by fastening the band portion.

[Second Embodiment]

Another embodiment will be described below. It should be noted that the configuration of the sander 1 is the same as that of the first embodiment. Therefore, overlapping description will be omitted, and the dust collecting attachment will be mainly described.

Figure 6:
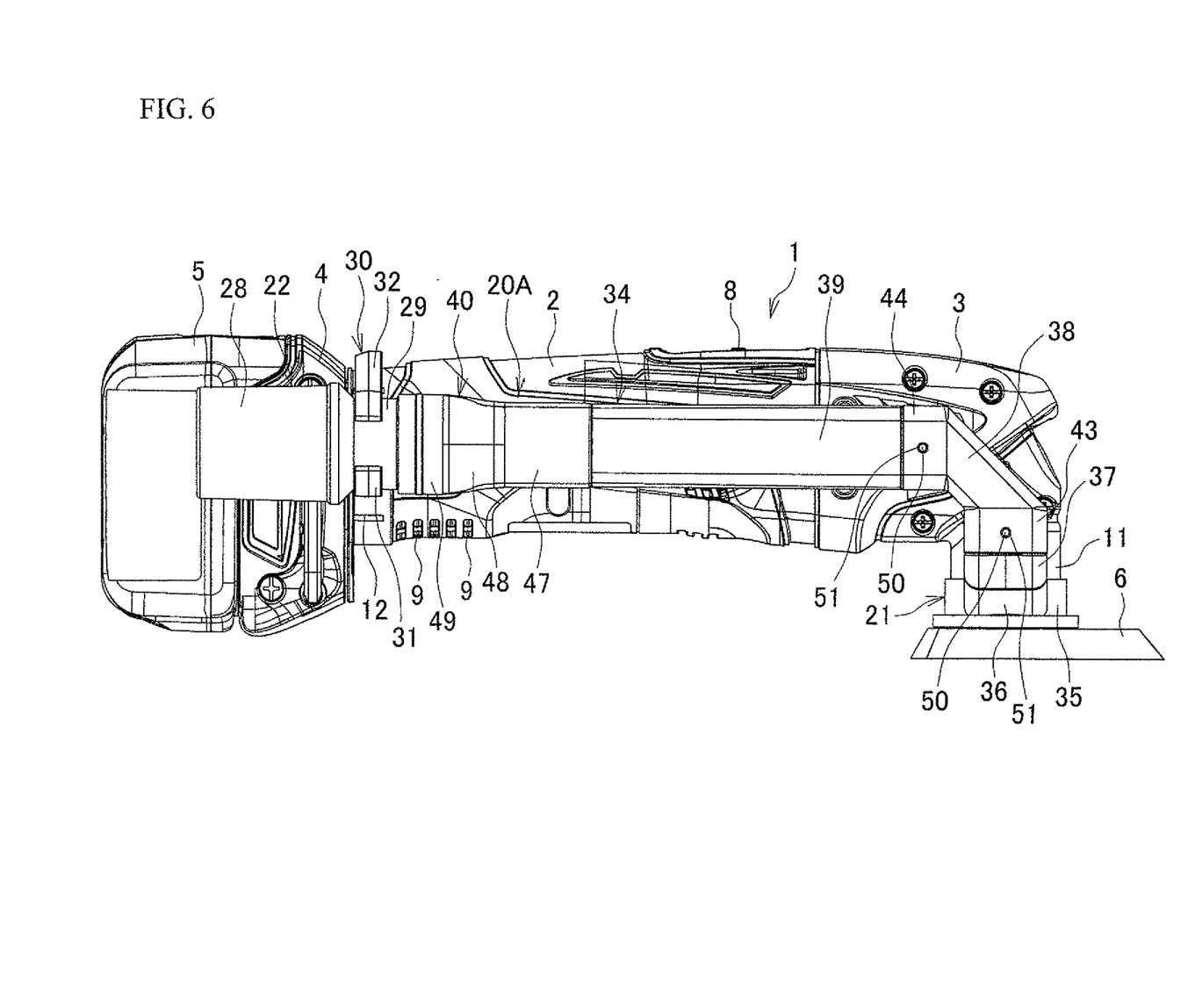
FIG. 6 is a side view of a sander according to a second embodiment of the present invention.
Figure 7:
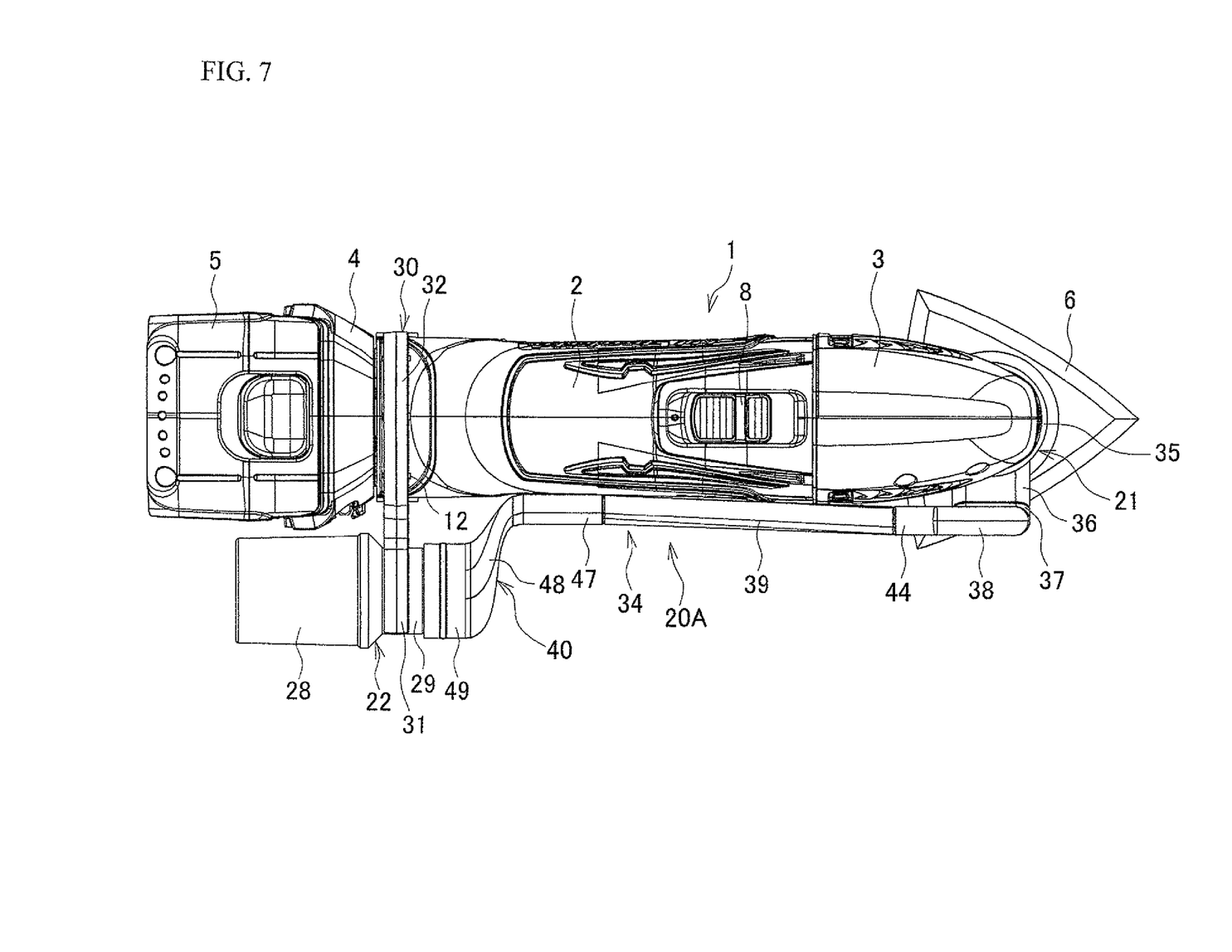
FIG. 7 is a plan view of the sander according to the second embodiment.
Figure 8:
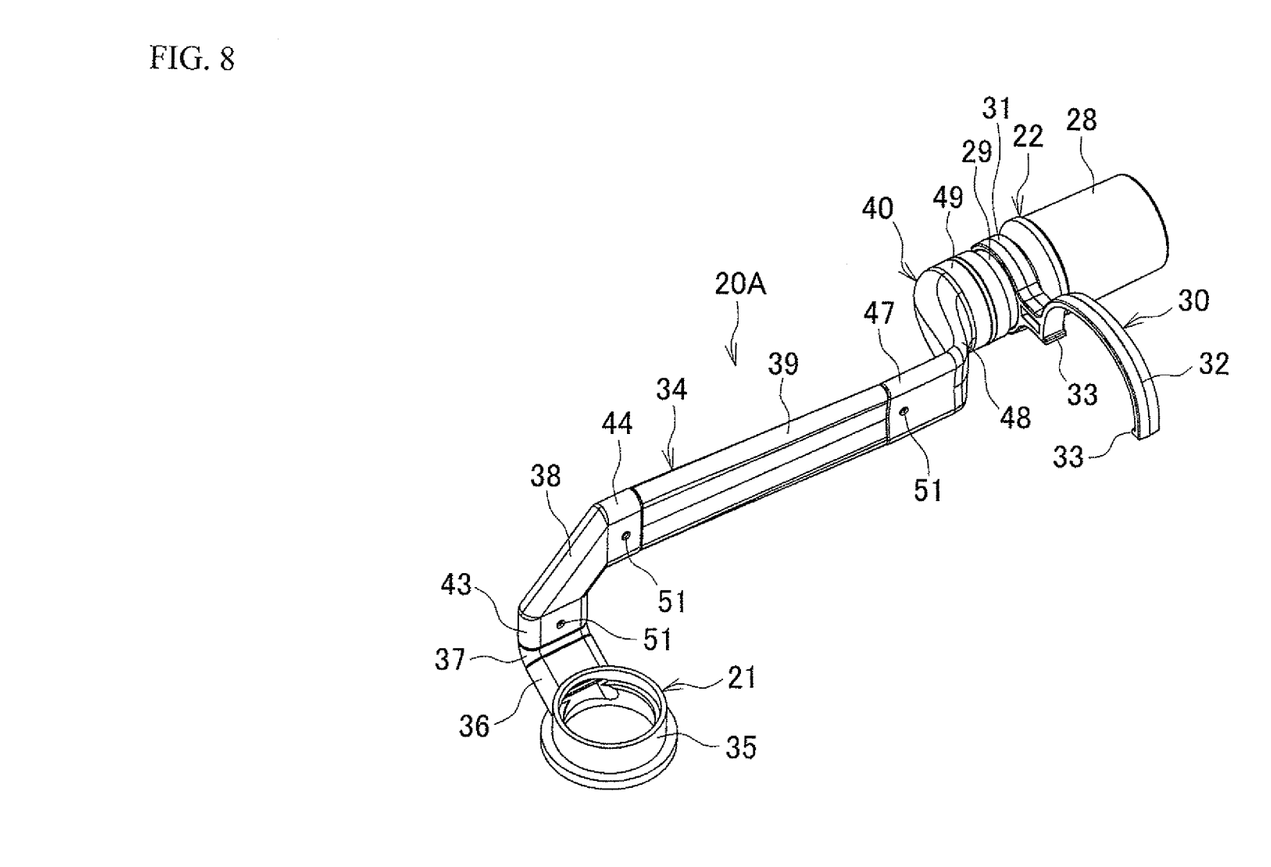
FIG. 8 is a perspective view of a dust collecting attachment according to the second embodiment.

In FIGS. 6 and 7, a dust collecting attachment 20A mounted on the sander 1 has a suction portion 21 in a front part of the dust, and a discharge portion 22 in its rear part, as shown in FIG. 8. Further, the suction portion 21 and the discharge portion 22 are connected by a flat pipe 34.

The suction portion 21 comprises a short cylindrical holder ring 35 placed above a base 6 and fitted on a cylinder portion 11, and a flat tube shaped front joint 36 connected to the lateral surface of the holder ring 35 in a radial direction and in an obliquely upward direction. As in the first embodiment, the discharge portion 22 includes a cylindrical rear joint 28 to which the rear end of the pipe 34 is connected by insertion, and a changeable member 30 that is detachably mounted to a small diameter portion 29 of the rear joint 28.

Figure 9:
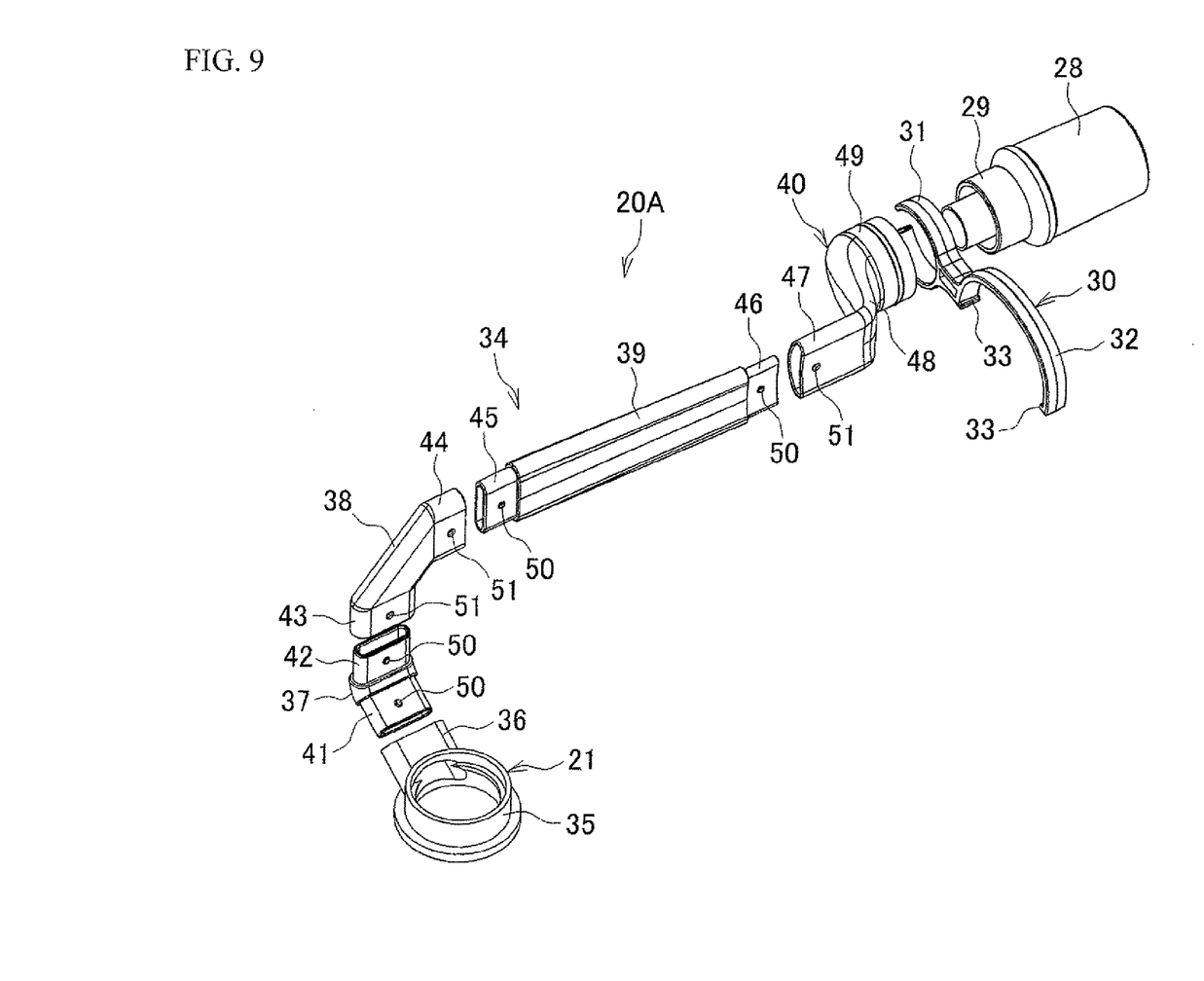
FIG. 9 is an exploded perspective view of the dust collecting attachment according to the second embodiment.

As shown in FIG. 9, the pipe 34 is formed by connecting four divided pipes, namely first to fourth divided pipes 37 to 40. The first divided pipe 37 is bent so as to have a V-shape as viewed from the front, and has a lower insertion portion 41 that extends obliquely downward at the lower end of the first divided pipe 37, and an upper insertion portion 42 that extends upward at the upper end of the first divided pipe 37. The lower insertion portion 41 is connected to a front joint 36 of the suction portion 21 by insertion. The upper insertion portion 42 is connected to the second divided pipe 38 by insertion.

The second divided pipe 38 is tilted upward in a rearward direction, and has a receiving cylinder portion 43 that extends downward at the lower end of the second divided pipe 38, and a receiving cylinder portion 44 that extends rearward at the rear end of the second divided pipe 38. The upper insertion portion 42 of the first divided pipe 37 is connected to the receiving cylinder portion 43 by insertion, and the third divided pipe 39 is connected to the receiving cylinder portion 44 by insertion.

The third divided pipe 39 extends linearly in a longitudinal direction, and has a front insertion portion 45 at its front end, and a rear insertion portion 46 at its rear end. The front insertion portion 45 is connected to the receiving cylinder portion 44 of the second divided pipe 38 by insertion, and the rear insertion portion 46 is connected to the fourth divided pipe 40 by insertion.

The fourth divided pipe 40 is formed by a receiving cylinder portion 47, an expanded portion 48, and a cylindrical portion 49. The receiving cylinder portion 47 is flat in the longitudinal direction, and the rear insertion portion 46 of the third divided pipe 39 is connected to the receiving cylinder portion 47 by insertion. The expanded portion 48 is connected to the rear end of the receiving cylinder portion 47 so as to extend perpendicularly to the receiving cylinder portion 47, and is formed such that a portion closer to the rear has a larger diameter and a more circular shape. The cylinder portion 49 is connected to the rear end of the expanded portion 48, and the small diameter portion 29 of the rear joint 28 is connected to the cylinder portion 49 by insertion.

In the first and third divided pipes 37, 39, protrusions 50, 50 are provided on both outer surfaces in a thickness direction of each insertion portion 41, 42, 45, 46. In the second and fourth divided pipes 38, 40, through holes 51, 51 are formed in both inner surfaces in the thickness direction of each receiving cylinder portion 43, 44, 47 so that the protrusions 50 fit therein when the insertion portions are in the connected state. Accordingly, it prevents the insertion portions from being coming off.

In the dust collecting attachment 20A and the sander 1 configured as described above, the state in which the pipe 34 is extended can be changed by selecting the direction in which the changeable member 30 is mounted with respect to the rear joint 28, and the direction of the front joint 36 of the suction portion 21, and by selecting the directions of the first, third, and fourth divided pipes 37, 39, 40 by disassembling the pipe 34.

First, in order to place the pipe 34 on the left surface side of the sander 1, as shown in FIG. 6, the holder ring 35 of the suction portion 21 is mounted on the cylinder portion 11, and is rotated to such a position as to extend the front joint 36 leftward. Subsequently, the lower insertion portion 41 of the first divided pipe 37 is connected to the front joint 36 by insertion in such a direction as to extend the upper insertion portion 42 upward. Then, the upper insertion portion 42 is connected to the receiving cylinder portion 43 of the second divided pipe 38 by insertion in such a direction as to extend the receiving cylinder portion 44 rearward.

Figure 11:
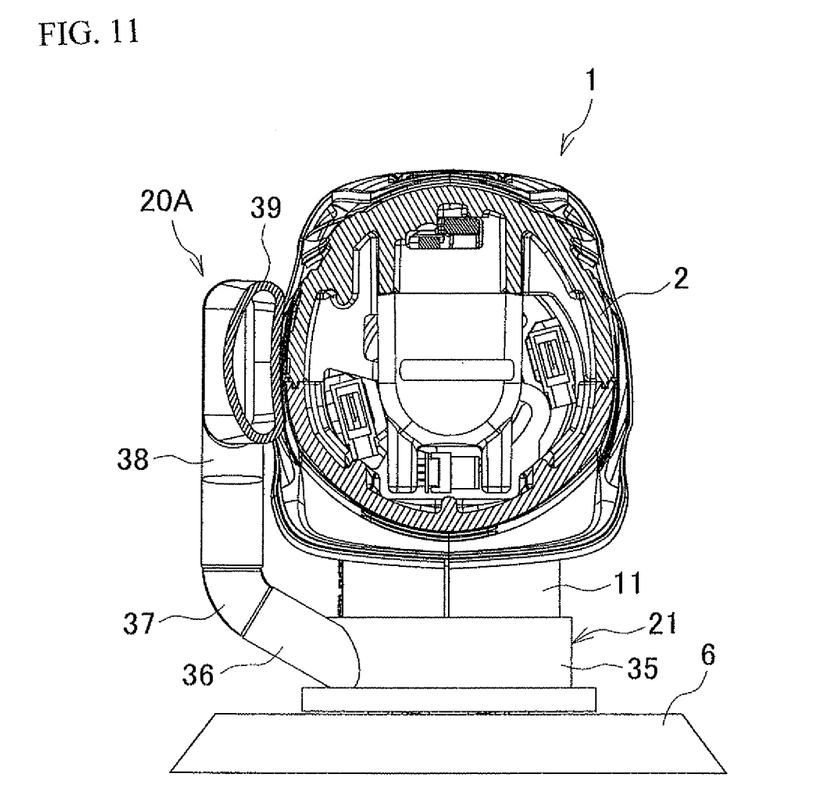
FIG. 11 is a cross-sectional view of a motor housing portion in FIG. 10.

Thereafter, the front insertion portion 45 of the third divided pipe 39 is connected to the receiving cylinder portion 44 of the second divided pipe 38 by insertion. As also shown in FIG. 11, the rear half of the third divided pipe 39 is formed as a flat transverse section to be curved along the peripheral surface of the motor housing 2. Thus, the front insertion portion 45 of the third divided pipe 39 and the receiving cylinder portion 44 of the second divided pipe 38 are connected so that the curve of the third divided pipe 39 matches with the peripheral surface of the motor housing 2. Then, the rear insertion portion 46 of the third divided pipe 39 is connected to the receiving cylinder portion 47 of the fourth divided pipe 40 by insertion in such a direction that the cylinder portion 49 is located outside and laterally extends. Moreover, the rear joint 28 is connected to the cylinder portion 49 by insertion. The band portion 32 of the changeable member 30 holding the small diameter portion 29 is fitted on the motor housing 2 from above, and claw portions 33, 33 are engaged with the left and right engaging holes 12, 12. Thus, as shown in FIGS. 6 and 7, the pipe 34 is extended along the left side surface of the sander 1.

On the other hand, in order to place the pipe 34 on the right surface side of the sander 1, the pipe 34 is first disassembled by detaching the first divided pipe 37 from the front joint 36 of the suction portion 21 and detaching the second divided pipe 38 from the third divided pipe 39, and the changeable member 30 is also detached from the discharge portion 22.

Next, the holder ring 35 is rotated so that the front joint 36 extends rightward. The first divided pipe 37 is reversed in lateral orientation from that of the above-described configuration, and the lower insertion portion 41 of the first divided pipe 37 is connected to the front joint 36 by insertion. Then, the second divided pipe 38 is connected to the upper insertion portion 42. The third divided pipe 39 having both the fourth divided pipe 40 and the discharge portion 22 being connected thereto is reversed in lateral orientation from that of the above-described configuration, and the front insertion portion 45 of the third divided pipe 39 is connected to the receiving cylinder portion 44 of the second divided pipe 38 by insertion. Therefore, the cylinder portion 49 of the fourth divided portion 40 and the discharge portion 22 are located on the opposite side of the motor housing 2 from that shown in FIGS. 6 and 7.

Figure 10:
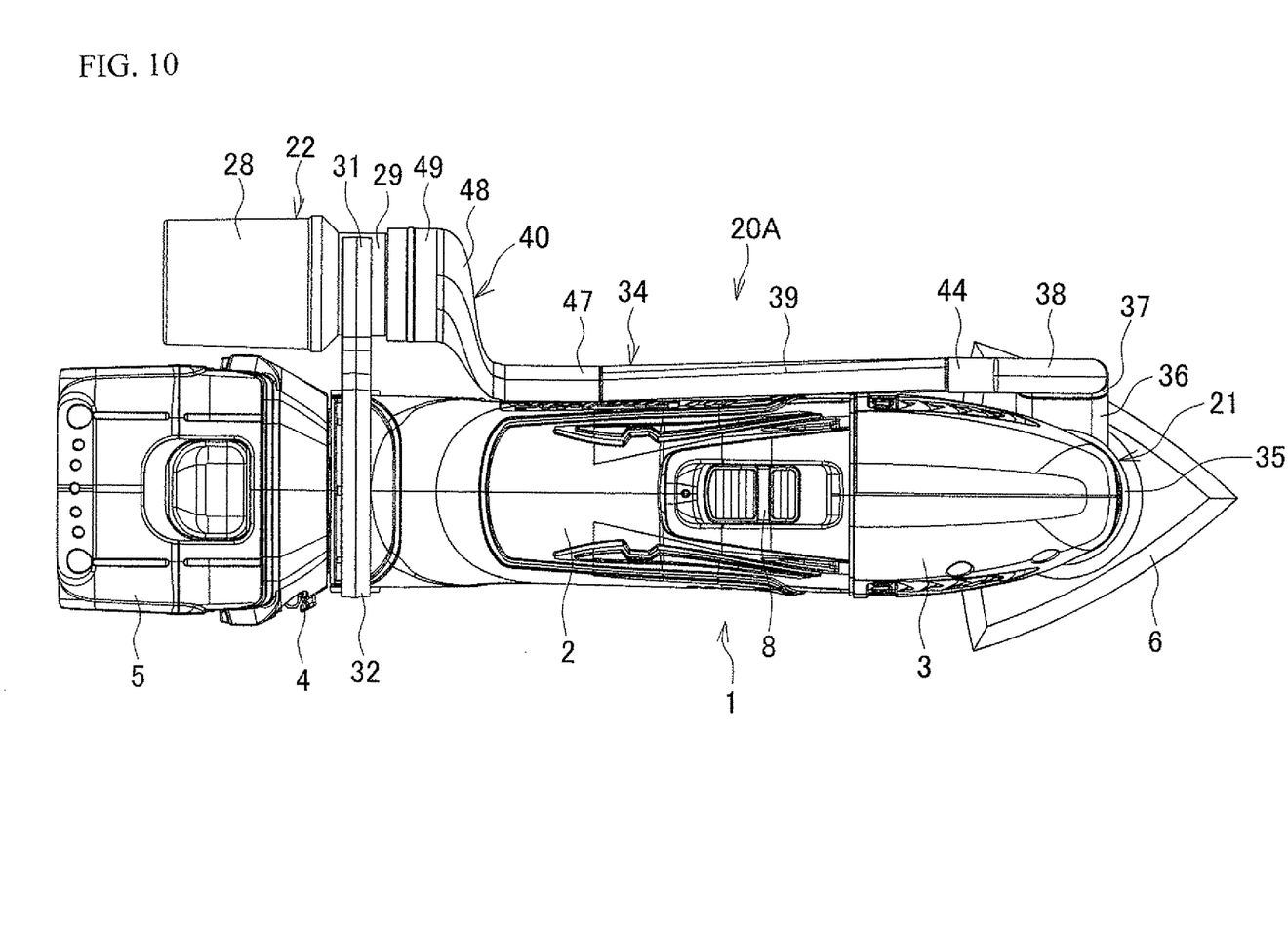
FIG. 10 is a plan view of the sander according to the second embodiment in which a pipe is extended on the opposite side.

Lastly, the changeable member 30 is reattached to the motor housing 2 and the discharge portion 22 in a manner opposite to that of the above-described configuration. Thus, the pipe 34 is extended along the right side surface of the sander 1, as shown in FIGS. 10 and 11.

As described above, by changing the direction of the front joint 36, reversing the lateral orientation of one or more of the divided pipes 37 to 40, and selecting the lateral position of the discharge portion 22 by the changeable member 30, the pipe 34 can be extended on the lateral surface side where the pipe 34 does not obstruct the operation, according to the dominant hand and the operation condition.

As described above, the dust collecting attachment 20A and the sander 1 according to the second embodiment also include the suction portion 21 mounted on the portion of the front housing 3 where the output shaft S projects, the pipe 34 having its front end connected to the suction portion 21, the discharge portion 22 connected to the rear end of the pipe 34, and the changeable member 30 placed on both the motor housing 2 and the discharge portion 22 and allowing the discharge portion 22 to be mounted at laterally symmetrical positions with respect to the motor housing 2. In the present embodiment, however, the pipe 34 is divided into the first to fourth divided pipes 37 to 40 that can be detached from each other and can be reconnected together in laterally reversed orientation. Thus, by selecting the lateral orientation of the divided pipes 37 to 40, the pipe 34 can connect the suction portion 21 and the discharge portion 22 on the lateral surface side of the motor housing 2 which corresponds to the lateral position of the discharge portion 22. Accordingly, the dust collecting attachment 20A can be mounted on the sander 1 such that the operator does not need to hold the pipe 34 and the dust collecting attachment 20A does not obstruct the operation regardless of his/her dominant hand. Therefore, usability is improved.

In particular, in this example, the pipe 44 is formed so that at least a portion extending along the lateral surface of the motor housing 2 has a flat transverse section conforming thereto. Accordingly, even if the pipe 34 is extended, only a small portion of the pipe 34 projects from the motor housing 2. Therefore, the pipe 34 may not be obstructed for operation.

Moreover, the divided pipes 37 to 40 are connected by insertion. The protrusions 50 are formed in one of the inserted end and the receiving end, and the through holes 51 are formed in the other end so that the protrusions 50 fit in the through holes 51 when both of the ends are connected by insertion. Thus, the detachment of the inserted end may be prevented so that the pipe 34 is stabilized in the connected state.

Although the pipe is formed by the four divided pipes in the second embodiment, the number of divided pipes may be increased or decreased as appropriate. For example, the pipe may be formed by three divided pipes configured to provide to the third divided pipe and the fourth divided pipe as a single divided pipe. In the second embodiment, the front joint of the suction portion is rotated to the right or left side in order to extend the pipe. However, depending on a configuration of divided pipes, the front joint may be rotated to the rear side as in the first embodiment in order to extend the pipe on the left or right side. Alternatively, the present invention is not limited to the case where the front joint is provided on the side of the suction portion. The front joint may be provided as a separate member from the holder ring and used as a part of the pipe.

The configuration in which protrusions and the through holes are formed in the ends of the divided pipes may be opposite from that of the second embodiment. In other words, the protrusions may be formed in the receiving ends of the divided pipes, and the through holes may be formed in the inserted ends of the divided pipes. Recesses may be formed instead of the through holes. The mounting configuration of the changeable member may be changed in a manner similar to that described in the first embodiment.

In both the first and second embodiments, the electric power tool is not limited to the sander, and may be other types of electric power tool such as a grinder. The electric power tool is not limited to a DC tool using a battery pack as a power source, and may be a so-called AC tool.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A dust collecting attachment for an electric power tool, which is mounted on the electric power tool that has a housing extending in a longitudinal direction and used as a holding portion, and an output shaft projecting downward from a front part of the housing, comprising:
   a suction portion mounted on a portion of the housing where the output shaft projects;
   a pipe having a front end of the pipe connected to the suction portion;
   a discharge portion connected to a rear end of the pipe; and
   a changeable member that is placed on both the housing and the discharge portion, and allows the discharge portion to be mounted at laterally symmetrical positions with respect to the housing, wherein
   the pipe is divided into a plurality of divided pipes detached from each other and reconnected together in laterally reversed orientation, and by selecting lateral orientation of the divided pipes, the pipe can connect the suction portion and the discharge portion on a lateral surface side of the housing which corresponds to a lateral position of the discharge portion.

2. The dust collecting attachment for an electric power tool according to claim 1, wherein
   the pipe is formed so that at least a portion of the pipe along a lateral surface of the housing has a flat transverse section conforming to the lateral surface of the housing.

3. The dust collecting attachment for an electric power tool according to claim 1, wherein
   the divided pipes are connected by insertion, a protrusion is formed in one of an inserted end and a receiving end of the divided pipes, and a through hole or a recess is formed in the other end so that the protrusion fits in the through hole or the recess when both of the ends are connected by insertion.

4. The dust collecting attachment for an electric power tool according to claim 1, wherein
   the pipe is formed by connecting four divided pipes, which are first to fourth divided pipes.

5. An electric power tool, comprising:
   a housing extending in a longitudinal direction and used as a holding portion;
   an output shaft projecting downward from a front part of the housing; and
   the dust collecting attachment for the electric power tool according to claim 1.

* * * * *